US008337014B2

(12) United States Patent
Kokonaski et al.

(10) Patent No.: US 8,337,014 B2
(45) Date of Patent: Dec. 25, 2012

(54) ELECTRONIC EYEGLASS FRAME

(75) Inventors: William Kokonaski, Gig Harbor, WA (US); Ronald Blum, Roanoke, VA (US); Tiziano Tabacchi, Pieve di Cadore (IT); Martin Boch, Kieselbronn (DE); Massimo Pinazza, Pieve di Cadore (IT); Scott N. Richman, Irvine, CA (US); Volkan Ozguz, Aliso Viejo, CA (US); Joshua N. Haddock, Roanoke, VA (US)

(73) Assignee: PixelOptics, Inc., Roanoke, VA (US)

( * ) Notice: Subject to any disclaimer, the term of this patent is extended or adjusted under 35 U.S.C. 154(b) by 0 days.

(21) Appl. No.: 12/834,526

(22) Filed: Jul. 12, 2010

(65) Prior Publication Data

US 2010/0271588 A1 Oct. 28, 2010

Related U.S. Application Data

(63) Continuation of application No. 12/054,299, filed on Mar. 24, 2008, now abandoned.

(60) Provisional application No. 60/796,876, filed on May 3, 2006, provisional application No. 60/924,225, filed on May 4, 2007, provisional application No. 60/929,419, filed on Jun. 26, 2007, provisional application No. 60/854,677, filed on Oct. 27, 2006, provisional application No. 60/929,991, filed on Jul. 20, 2007, provisional application No. 60/978,517, filed on Oct. 9, 2007.

(51) Int. Cl.
*G02C 1/00* (2006.01)

(52) U.S. Cl. ....................................................... 351/158

(58) Field of Classification Search .................. 351/158, 351/41, 49, 168, 169, 228, 246, 215, 216, 351/232, 159; 359/652, 655, 665, 666, 494, 359/245, 254

See application file for complete search history.

(56) References Cited

U.S. PATENT DOCUMENTS

| 2,437,642 A | 3/1948 | Henroleau |
| 2,576,581 A | 11/1951 | Edwards |
| 3,161,718 A | 12/1964 | De Luca |
| 3,245,315 A | 4/1966 | Marks et al. |
| 3,309,162 A | 3/1967 | Kosanke et al. |
| 3,614,215 A | 10/1971 | Mackta |
| 3,738,734 A | 6/1973 | Tait et al. |

(Continued)

FOREIGN PATENT DOCUMENTS

CN 89113088 10/2001

(Continued)

OTHER PUBLICATIONS

Kowel, Stephen T., et. al; Focusing by electrical modulation of refraction in a liquid crystal cell; Applied Optics; Jan. 15, 1984; vol. 23, No. 2.

(Continued)

*Primary Examiner* — Hung Dang
(74) *Attorney, Agent, or Firm* — Kilpatrick Townsend & Stockton LLP

(57) ABSTRACT

The present invention generally relates to integrating electronic components into an electro-active frame for driving electro-active focusing lenses. This is accomplished in a cosmetically pleasing manner that allows a platform of frame systems to be built from a single electronic module. Specifically, the present invention discloses controlling an electro-active lens in a deliberate, hands free manner that gives the user control of the electro-active lens.

30 Claims, 18 Drawing Sheets

U.S. PATENT DOCUMENTS

| | | |
|---|---|---|
| 3,791,719 A | 2/1974 | Kratzer et al. |
| 4,062,629 A | 12/1977 | Winthrop |
| 4,152,846 A | 5/1979 | Witt |
| 4,174,156 A | 11/1979 | Glorieux |
| 4,181,408 A | 1/1980 | Senders |
| 4,190,330 A | 2/1980 | Berreman |
| 4,264,154 A | 4/1981 | Petersen |
| 4,279,474 A | 7/1981 | Belgorod |
| 4,300,818 A | 11/1981 | Schachar |
| 4,373,218 A | 2/1983 | Schachar |
| 4,395,736 A | 7/1983 | Fraleux |
| 4,418,990 A | 12/1983 | Gerber |
| 4,423,929 A | 1/1984 | Gomi |
| 4,457,585 A | 7/1984 | DuCorday |
| 4,461,550 A | 7/1984 | Legendre |
| 4,466,703 A | 8/1984 | Nishimoto |
| 4,466,706 A | 8/1984 | Lamothe, II |
| 4,529,268 A | 7/1985 | Brown |
| 4,537,479 A | 8/1985 | Shinohara et al. |
| 4,564,267 A | 1/1986 | Nishimoto |
| 4,572,616 A | 2/1986 | Kowel et al. |
| 4,577,928 A | 3/1986 | Brown |
| 4,601,545 A | 7/1986 | Kern |
| 4,609,824 A | 9/1986 | Munier et al. |
| 4,712,870 A | 12/1987 | Robinson et al. |
| 4,756,605 A | 7/1988 | Okada et al. |
| 4,772,094 A | 9/1988 | Sheiman |
| D298,250 S | 10/1988 | Kildall |
| 4,787,733 A | 11/1988 | Silva |
| 4,787,903 A | 11/1988 | Grendahl |
| 4,795,248 A | 1/1989 | Okada et al. |
| 4,813,777 A | 3/1989 | Rainville et al. |
| 4,818,095 A | 4/1989 | Takeuchi |
| 4,836,652 A | 6/1989 | Oishi et al. |
| 4,842,400 A | 6/1989 | Klein |
| 4,880,300 A | 11/1989 | Payner et al. |
| 4,890,903 A | 1/1990 | Treisman et al. |
| 4,904,063 A | 2/1990 | Okada et al. |
| 4,907,860 A | 3/1990 | Noble |
| 4,909,626 A | 3/1990 | Purvis et al. |
| 4,919,520 A | 4/1990 | Okada et al. |
| 4,921,728 A | 5/1990 | Takiguchi et al. |
| 4,927,241 A | 5/1990 | Kuijk |
| 4,929,865 A | 5/1990 | Blum |
| 4,930,884 A | 6/1990 | Tichenor et al. |
| 4,944,584 A | 7/1990 | Maeda et al. |
| 4,945,242 A | 7/1990 | Berger et al. |
| 4,952,788 A | 8/1990 | Berger et al. |
| 4,955,712 A | 9/1990 | Barth et al. |
| 4,958,907 A | 9/1990 | Davis |
| 4,961,639 A | 10/1990 | Lazarus |
| 4,968,127 A | 11/1990 | Russell et al. |
| 4,981,342 A | 1/1991 | Fiala |
| 4,991,951 A | 2/1991 | Mizuno et al. |
| 5,015,086 A | 5/1991 | Okaue et al. |
| 5,030,882 A | 7/1991 | Solero |
| 5,050,981 A | 9/1991 | Roffman |
| 5,066,301 A | 11/1991 | Wiley |
| 5,067,795 A | 11/1991 | Senatore |
| 5,073,021 A | 12/1991 | Marron |
| 5,076,665 A | 12/1991 | Petersen |
| 5,089,023 A | 2/1992 | Swanson |
| 5,091,801 A | 2/1992 | Ebstein |
| 5,108,169 A | 4/1992 | Mandell |
| 5,114,628 A | 5/1992 | Hofer et al. |
| 5,130,856 A | 7/1992 | Tichenor et al. |
| 5,142,411 A | 8/1992 | Fiala |
| 5,150,234 A | 9/1992 | Takahashi et al. |
| 5,171,266 A | 12/1992 | Wiley et al. |
| 5,182,585 A | 1/1993 | Stoner |
| 5,184,156 A | 2/1993 | Black et al. |
| 5,200,859 A | 4/1993 | Payner et al. |
| 5,208,688 A | 5/1993 | Fergason et al. |
| 5,229,797 A | 7/1993 | Futhey et al. |
| 5,229,885 A | 7/1993 | Quaglia |
| 5,231,430 A | 7/1993 | Kohayakawa |
| 5,239,412 A | 8/1993 | Naka et al. |
| D342,063 S | 12/1993 | Howitt et al. |
| 5,305,028 A | 4/1994 | Okano |
| 5,306,926 A | 4/1994 | Yonemoto |
| 5,324,930 A | 6/1994 | Jech, Jr. |
| D350,342 S | 9/1994 | Sack |
| 5,352,886 A | 10/1994 | Kane |
| 5,359,444 A | 10/1994 | Piosenka et al. |
| 5,375,006 A | 12/1994 | Haas |
| 5,382,986 A | 1/1995 | Black et al. |
| 5,386,308 A | 1/1995 | Michel et al. |
| 5,424,927 A | 6/1995 | Schaller et al. |
| 5,440,357 A | 8/1995 | Quaglia |
| 5,443,506 A | 8/1995 | Garabet |
| 5,451,766 A | 9/1995 | Van Berkel |
| 5,463,428 A | 10/1995 | Lipton et al. |
| 5,488,439 A | 1/1996 | Weltmann |
| 5,522,323 A | 6/1996 | Richard |
| 5,552,841 A | 9/1996 | Gallorini et al. |
| 5,608,567 A | 3/1997 | Grupp |
| 5,615,588 A | 4/1997 | Gottschald |
| 5,654,786 A | 8/1997 | Bylander |
| 5,668,620 A | 9/1997 | Kurtin et al. |
| 5,682,223 A | 10/1997 | Menezes et al. |
| 5,683,457 A | 11/1997 | Gupta et al. |
| RE35,691 E | 12/1997 | Theirl et al. |
| 5,710,615 A | 1/1998 | Kitani |
| 5,712,721 A | 1/1998 | Large |
| 5,728,155 A | 3/1998 | Anello et al. |
| 5,739,959 A | 4/1998 | Quaglia |
| 5,777,719 A | 7/1998 | Williams et al. |
| 5,815,233 A | 9/1998 | Morokawa et al. |
| 5,815,239 A | 9/1998 | Chapman et al. |
| 5,861,936 A | 1/1999 | Sorensen |
| 5,877,876 A | 3/1999 | Birdwell |
| 5,900,720 A | 5/1999 | Kallman et al. |
| 5,949,521 A | 9/1999 | Williams et al. |
| 5,953,098 A | 9/1999 | Lieberman et al. |
| 5,956,183 A | 9/1999 | Epstein et al. |
| 5,963,300 A | 10/1999 | Horwitz |
| 5,971,540 A | 10/1999 | Ofner |
| 5,980,037 A | 11/1999 | Conway |
| 5,999,328 A | 12/1999 | Kurtin et al. |
| 6,040,947 A | 3/2000 | Kurtin et al. |
| 6,050,687 A | 4/2000 | Bille et al. |
| 6,069,742 A | 5/2000 | Silver |
| 6,086,203 A | 7/2000 | Blum et al. |
| 6,086,204 A | 7/2000 | Magnante |
| 6,095,651 A | 8/2000 | Williams et al. |
| 6,097,450 A | 8/2000 | Humphrey |
| 6,099,117 A | 8/2000 | Gregory |
| 6,115,177 A | 9/2000 | Vossler |
| 6,145,987 A | 11/2000 | Baude et al. |
| 6,188,525 B1 | 2/2001 | Silver |
| 6,191,881 B1 | 2/2001 | Tajima |
| 6,213,602 B1 | 4/2001 | Smarto |
| 6,270,220 B1 | 8/2001 | Keren |
| 6,271,915 B1 | 8/2001 | Frey et al. |
| 6,305,802 B1 | 10/2001 | Roffman et al. |
| 6,325,508 B1 | 12/2001 | Decreton et al. |
| 6,350,031 B1 | 2/2002 | Lashkari et al. |
| 6,390,623 B1 | 5/2002 | Kokonaski et al. |
| 6,396,622 B1 | 5/2002 | Alden |
| 6,437,762 B1 | 8/2002 | Birdwell |
| 6,437,925 B1 | 8/2002 | Nishioka |
| 6,464,363 B1 | 10/2002 | Nishioka et al. |
| 6,491,394 B1 * | 12/2002 | Blum et al. .................. 351/228 |
| 6,501,443 B1 | 12/2002 | McMahon |
| 6,554,425 B1 | 4/2003 | Roffman et al. |
| 6,607,271 B2 | 8/2003 | Bar et al. |
| 6,609,794 B2 | 8/2003 | Levine |
| 6,614,408 B1 | 9/2003 | Mann |
| 6,616,275 B1 | 9/2003 | Dick et al. |
| 6,616,279 B1 | 9/2003 | Davis et al. |
| 6,618,208 B1 | 9/2003 | Silver |
| 6,626,532 B1 | 9/2003 | Nishioka et al. |
| 6,631,001 B2 | 10/2003 | Kuiseko |
| 6,682,195 B2 | 1/2004 | Dreher |
| 6,709,105 B2 | 3/2004 | Menezes |
| 6,709,108 B2 | 3/2004 | Levine et al. |
| 6,738,199 B2 | 5/2004 | Nishioka |

| | | |
|---|---|---|
| 6,768,536 B2 | 7/2004 | Okuwaki et al. |
| 6,774,871 B2 | 8/2004 | Birdwell |
| 6,778,246 B2 | 8/2004 | Sun et al. |
| 6,833,938 B2 | 12/2004 | Nishioka |
| 6,840,619 B2 | 1/2005 | Dreher |
| 6,851,805 B2 | 2/2005 | Blum et al. |
| 6,871,951 B2 | 3/2005 | Blum et al. |
| 6,883,916 B2 | 4/2005 | Menezes |
| 6,886,938 B1 | 5/2005 | Menezes |
| 6,893,124 B1 | 5/2005 | Kurtin |
| 6,918,670 B2 | 7/2005 | Blum et al. |
| 6,948,818 B2 | 9/2005 | Williams et al. |
| 6,951,391 B2 | 10/2005 | Morris et al. |
| 6,955,433 B1 | 10/2005 | Wooley et al. |
| 6,956,682 B2 | 10/2005 | Wooley |
| 6,986,579 B2 | 1/2006 | Blum et al. |
| 7,008,054 B1 | 3/2006 | Kurtin et al. |
| 7,009,757 B2 | 3/2006 | Nishioka et al. |
| 7,019,890 B2 | 3/2006 | Meredith et al. |
| 7,030,411 B2 * | 4/2006 | Krulevitch et al. ............ 257/57 |
| 7,041,133 B1 | 5/2006 | Azar |
| 7,085,065 B2 | 8/2006 | Silver |
| 7,090,348 B2 | 8/2006 | Nason et al. |
| 7,133,172 B2 | 11/2006 | Nishioka |
| 7,159,983 B2 | 1/2007 | Menezes et al. |
| 7,229,173 B2 | 6/2007 | Menezes |
| 7,850,304 B2 * | 12/2010 | Jacobs et al. ................. 351/159 |
| 2002/0140899 A1 | 10/2002 | Blum et al. |
| 2002/0149739 A1 | 10/2002 | Perrott et al. |
| 2002/0186346 A1 | 12/2002 | Stantz et al. |
| 2003/0018383 A1 | 1/2003 | Azar |
| 2003/0151721 A1 | 8/2003 | Lai et al. |
| 2003/0210377 A1 | 11/2003 | Blum et al. |
| 2004/0000733 A1 | 1/2004 | Swab et al. |
| 2004/0008319 A1 | 1/2004 | Lai et al. |
| 2004/0108971 A1 | 6/2004 | Waldern et al. |
| 2004/0117011 A1 | 6/2004 | Aharoni et al. |
| 2004/0130677 A1 | 7/2004 | Liang et al. |
| 2004/0179280 A1 | 9/2004 | Nishioka |
| 2004/0196435 A1 | 10/2004 | Dick et al. |
| 2004/0246440 A1 | 12/2004 | Andino et al. |
| 2005/0073739 A1 | 4/2005 | Meredith |
| 2005/0078274 A1 | 4/2005 | Howell et al. |
| 2005/0124983 A1 | 6/2005 | Frey et al. |
| 2005/0140924 A1 | 6/2005 | Blum et al. |
| 2005/0248719 A1 * | 11/2005 | Howell et al. ................. 351/41 |
| 2005/0264752 A1 | 12/2005 | Howell et al. |
| 2005/0270479 A1 | 12/2005 | Canavan et al. |
| 2006/0001827 A1 | 1/2006 | Howell et al. |
| 2006/0023158 A1 | 2/2006 | Howell et al. |
| 2006/0044510 A1 | 3/2006 | Williams et al. |
| 2006/0092340 A1 | 5/2006 | Blum et al. |
| 2006/0203186 A1 | 9/2006 | Ifergan |
| 2007/0258039 A1 | 11/2007 | Duston et al. |
| 2010/0271588 A1 | 10/2010 | Kokonaski et al. |

FOREIGN PATENT DOCUMENTS

| | | |
|---|---|---|
| DE | 4223395 | 1/1994 |
| EP | 0 027 339 | 4/1981 |
| EP | 0154962 | 9/1985 |
| EP | 0 225 034 | 6/1987 |
| EP | 0233104 | 8/1987 |
| EP | 0237365 | 9/1987 |
| EP | 0 308 705 | 3/1989 |
| EP | 0 578 833 | 1/1994 |
| EP | 0 649 044 | 4/1995 |
| GB | 2170613 | 8/1986 |
| GB | 2169417 | 7/1987 |
| JP | 55-076323 | 6/1980 |
| JP | 61156227 | 7/1986 |
| JP | 61177429 | 8/1986 |
| JP | 1 237610 | 9/1989 |
| JP | 05-100201 | 4/1993 |
| JP | 11352445 | 12/1998 |
| WO | WO 92/01417 | 2/1992 |
| WO | WO 98/27863 | 7/1998 |
| WO | WO 99/27334 | 6/1999 |
| WO | WO 03/050472 | 6/2003 |
| WO | WO 03/068059 | 8/2003 |
| WO | WO 2004/008189 | 1/2004 |
| WO | WO 2004/015481 | 2/2004 |
| WO | WO 2004/034095 | 4/2004 |
| WO | WO 2004/072687 | 8/2004 |

OTHER PUBLICATIONS

Thibos, Larry N., et. al.; Vision through a liquid-crystal spatial light modulator; Adaptive Optics Conference; 1999; Durham, UK.

Thibos, Larry N., et. al.; Use of Liquid-Crystal Adaptive-Optics to Alter the Refractive State of the Eye; Optometry and Vision Science; Jul. 1997; vol. 74, No. 7; American Academy of Optometry.

Thibos, Larry N., et. al.; Electronic Spectacles for the 21 St Century, Indian Journal of Optometry, Spring 1999; vol. 2, No. 1.

Bradley, Arthur; Profile: Larry N. Thibos, PhD., and Donald T. Miller, PhD.; Indiana Journal of Optometry; Spring 1999; vol. 2, No. 1.

Naumov, A.F.; Control Optimization of Spherical Modal Liquid Crystal Lenses; Optics Express, Apr. 26, 1999; vol. 4, No. 9; Optical Society of America.

Naumov, A.F.; Liquid Crystal Adaptive Lenses with Modal Control; Optics Letters, Jul. 1, 1998, vol. 23, No. 13; Optical Society of America.

Liquid Lenses Eye Commercial Breakthrough; Opto & Laser Europe, Nov. 2003.

Anderson, M.; Adaptive Optics: Liquid Crystals Lower the Cost of Adaptive Optics; Laser Focus World, Dec. 1999.

Davis, Robert A.; Computer Vision Syndrome—The Eyestrain Epidemic; Review of Optometry, Sep. 15, 1997.

Lazarus, Stuart M.; The Use of Yoked Base-Up and Base-In Prism for Reducing Eye Strain at the Computer; Journal of the American Optometric Association, Apr. 1996.

Eyecare Business, Oct. 1997.

The U.S. Appl. No. 12/054,299, filed Mar. 24, 2008.

The U.S. Appl. No. 60/796,876, filed May 3, 2006.

The U.S. Appl. No. 60/924,225, filed May 4, 2007.

The U.S. Appl. No. 60/929,419, filed Jun. 26, 2007.

The U.S. Appl. No. 60/854,697, filed Oct. 27, 2006.

The U.S. Appl. No. 60/854,677, filed Oct. 27, 2006.

The U.S. Appl. No. 60/929,991, filed Jul. 20, 2007.

The U.S. Appl. No. 60/978,517, filed Oct. 9, 2007.

Donald T. Miller, Xin Hong, and Larry N. Thibos, "Requirements for segmented spatial light modulators for diffraction-limited imaging through aberrated eyes," G.D. Love, ed. *Proceedings of the 2nd International Workshop on Adaptive Optics for Industry and Medicine*, World Scientific, Singapore, 63-68 (Jul. 1999).

* cited by examiner

ELECTRONIC EYEGLASS FRAME

CROSS REFERENCE TO RELATED APPLICATIONS

This application is a continuation of U.S. application Ser. No. 12/054,299 filed Mar. 24, 2008, now abandoned, which claims the benefit of U.S. Provisional Application No. 60/796,876 filed on May 3, 2006 and entitled, "Spectacle Frame Bridge Housing Electronics For Electro-active Spectacle Lenses" (now U.S. Ser. No. 11/797,210), U.S. Provisional Application No. 60/924,225 filed on May 4, 2007 and entitled, "Advanced Electro-Active Spectacles, U.S. Provisional Application No. 60/929,419 filed on Jun. 26, 2007 entitled, "Electronic Eyeglass Frames and Integration Thereof", and U.S. Provisional Application Nos. 60/854,697 and 60/854,677 respectively entitled, "Advanced Electronic Eyewear" and "Universal Temple End Piece For Spectacles both of which were filed on Oct. 27, 2006 (now together as Ser. No. 11/976,199), and U.S. Provisional Application No. 60/929,991, filed on Jul. 20, 2007 and entitled, "Electrical Connectivity Between Electro-Active Spectacles and Frames", and U.S. Provisional Application No. 60/978,517, filed on Oct. 9, 2007 and entitled, "Spectacle Frame with Universal Integrated Electronics", all of which are incorporated in their entirety herein by reference.

BACKGROUND OF THE INVENTION

1. Field of the Invention

The present invention generally relates to integrating electronic components into an electronic eyeglass frame for driving electro-active lenses capable of one or more of dynamic focus, dynamic changeable tint, and other electronic applications such as, by way of example only, an electronic display that may or may not be incorporated within the lens. This is accomplished in a cosmetically pleasing manner that allows a platform of frame systems to be built from a single electronic module. The present invention discloses controlling an electro-active lens in a deliberate, hands free manner that gives the user control of the electro-active lens. In addition, the present invention allows for a mostly universal electronics module or modules that can be applied to most eyeglass frames in such a manner (and location) whereby conductive wiring of the temples and the frame front is minimized, cosmetics and form factor of the eyeglass frame is maintained, and complicating issues of connecting electrical current thru the bridge or hinge of the eyeglass frame are mitigated.

2. Description of the Related Art

In today's world, spectacle eyeglass frames are very fashionable. While the trend for the eyeglass lenses is to make them thinner, lighter, and less visible, at the same time, it is the eyeglass frame that makes the fashion statement for the eyeglass wearer.

Concurrent with these trends is another concerning including electronics into spectacle eyewear. By way of example, Oakley™ has commercialized electronic eyewear called the Oakley Thump™ that incorporates a MP3 player into the temple of the eyewear that can be oriented properly for the wearer. The Oakley Thump is a prime example of what the invention disclosed here desires to avoid. That being a thick temple or frame housing electronics that distracts from the aesthetic appearance of the eyeglass frames. PixelOptics™ is developing electro-active eyewear that allow for the lens to dynamically focus for the wearer's distance vision needs without any moving parts. Electronic tints for the lens such as, by way of example only, electro-chromics, rapid change tint technology, and tint shuttering are being developed by others as well. Finally, electronic displays are being developed that fit within or on the eyeglass lens allowing the user to see an image floating in front of them in space. The trend of utilizing electronics in eyewear appears to be accelerating and the applications being developed by others are expanding.

As theses trends continue, it is becoming important to find ways to incorporate electronics into eyewear without harming the aesthetics and functionality of the eyewear. The challenge is to not limit the fashion design of the eyeglass frame or limit the materials which the eyeglass frame can be made of, maintain as few completed eyeglass frames or eyeglass frame components (frame fronts, bridges, temples) stock keeping units (SKUs) as possible, allow for robust placement of the electronics, and in a way that can be manufactured so that it remains affordable, and aesthetically desirable.

Various electronic components have been disclosed in prior art whereby said components are located in the side of one or both temples, in or on the end piece of the temple, in or on the eyeglass frame's bridge, in or on the lens or lenses, or affixed to the hinge or hinges that attach the frame's temple to the frame's front. While these approaches allow for enabling electronic frames and electro-active lenses, to date there has been no way for this to occur while minimizing the number of frame part SKUs, and maintaining the aesthetics of the frame.

The present invention also addresses the integration of electronic components into an electro-active frame for driving electro-active lenses for one or more of dynamically altering focus, tint or other electronic applications such as by way of example only an electronic display. The invention achieves this objective in a cosmetically pleasing manner that allows for a platform of frame systems to be built from one or more electronic modules.

These problems have been solved in a simple, convenient, and highly effective way by which to provide an improved electro-active frame having electronic components for driving electro-active lenses in a cosmetically pleasing manner that allows for a platform of frame systems to be built from one or more electronic modules. The present invention discloses controlling an electro-active lens in a deliberate, yet optional hands free control manner that effectively overcomes the aforementioned difficulties and longstanding problems inherent in electro-active eyewear. The invention further allows for the electronic module to control the electronic lens such that if the electronic lens is not in use the electronics are turned off to conserve battery power.

SUMMARY OF THE INVENTION

According to one aspect of the invention, an eyeglass frame is disclosed comprising a hinged temple. The temple further comprises an electronic module, which is located within a front spatial void of the eyeglass frame anterior to the hinge.

According to another aspect of the invention, an electronic module is disclosed that contains electronics and a power source for driving an electro-active lens. The module is designed to fit within a spatial void of an eyeglass frame directly connected to the electro-active lens without an intervening hinge.

According to another aspect of the invention, a method for controlling an electro-active lens is disclosed wherein the lens is activated when the wearer's head moves to a first position angled steeply down relative to the horizon, and wherein the lens, once activated, remains on until such a time as the wearer's head moves to a second position at an angle slightly above the horizon.

According to another aspect of the invention, a method for turning off the electronics is disclosed wherein after a specified period of time should the sensor sense there is no movement the controller will turn off the electrical power.

According to another aspect of the invention, a method for setting a time delay such to prevent the eyeglasses from switching their focus as one walks, runs, or moves his or her head while not intending to read at near.

According to a still further aspect of the invention, an electronic module attached to a rimless eyeglass frame near a rimless spatial void is disclosed wherein the frame has an electro-active lens to which the module is directly connected.

The method and apparatus of the present invention will be better understood by reference to the following detailed discussion of specific embodiments and the attached figures which illustrate and exemplify such embodiments.

According to still another aspect of the invention, a hinge-less temple is provided such that the electronic module can be located within the spatial void or any where on the temple including the end piece behind the ear.

DESCRIPTION OF THE DRAWINGS

A specific embodiment of the present invention will be described with reference to the following drawings, wherein.

DESCRIPTION OF THE PREFERRED EMBODIMENT

Figure 1A:
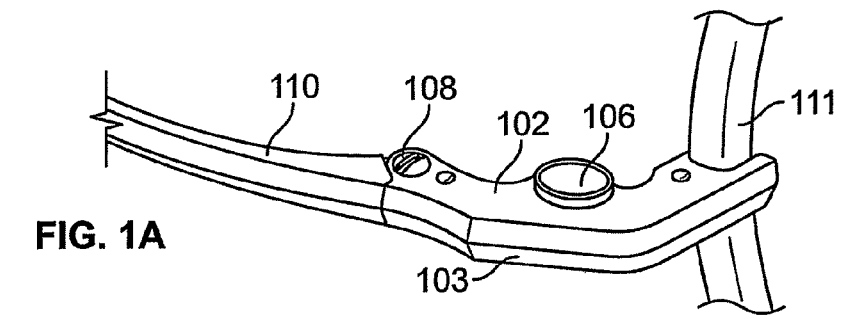
FIG. 1A illustrates a universal frame housing that comprises the electronic module, electronic connectors, and a hinge.

The following definitions for elements referred to in this application are set forth below.

DEFINITIONS a) Frame: A complete wearable housing that secures both spectacle lenses and aligns them in the proper place relative to the wearer's eyes when being worn.
b) Hinged temple: The side piece of a frame that connects to the frame front by way of a hinge attachment mechanism, and further provides stability by resting on the wearer's ears when worn.
c) Hinge-less temple: The side piece of a frame that connects to the frame front without a hinge attachment mechanism, and further provides stability by resting on the wearer's ears when worn.
d) Temple end piece: The part of the temple that is found farthest away from the frame front. The end piece usually begins behind the ear of the wearer and ends at the end of the temple that is located farthest away from the frame front.
e) Frame front end piece: The part of the frame front farthest away from the bridge and spatial to the bridge. Each frame has two, frame front end pieces; one on the spatial side of the right lens and/or right eye-wire and one on the spatial side of the left lens and/or eye-wire.
f) Bridge: The part of the frame front that fits over/superior to the wearer's nose. The bridge is usually found between the eye-wires that holds the right and left lenses, or the right and left lenses themselves.
g) Hinge: The part of the frame that allows for connecting the frame front and the temples in such away that the frame front and the temple can open and close against the frame front on its posterior side when not being worn.
h) Eye-wire: The part of the frame front that holds one lens (a right or a left). There are two eye-wires to each frame. However in a completely rimless frame there are no eye wires.
i) Frame front: The part of the frame to which the temples attach and which holds the lenses and if not a rimless frame front comprises both eye-wires.
j) Rimless frame: A frame that is designed without eye-wires.
k) Partially rimless: A frame that has a partial frame front and/or may have a nylon monofilament wire or similar feature that secures the lenses to the frame.
l) Zyle frame: A frame made out of largely plastic
m) Metal frame: A frame made out of mostly metal
n) Right spatial void: The space created where the right frame front that is within the plane of the front of the wearers face turns back to meet the right temple. The angle formed between the right frame front and the right temple is approximately (but not always) 90 degrees. This space is further defined as that which is bounded on three sides: On a first side by an imaginary line that is provided on the inside back surface of the right lens or inside right frame front, on a second side by that of an imaginary line that is located in the middle of the right temple not including any electronics affixed thereto, and on a third side which is bounded by the right side of the face and/or head of the wearer.
o) Left spatial void: The space created where the left frame front that is within the plane of the front of the wearers face turns back to meet the left temple. The angle formed between the left frame front and the left temple is approximately 90 degrees. This space is further defined as that which is bounded on three sides: On a first side by an imaginary line that is provided on the inside back surface of the left lens or inside left frame front, on a second side by that of an imaginary line that is located in the middle of the left temple not including any electronics affixed thereto, and on a third side which is bounded by the left side of the face and/or head of the wearer.

The following preferred embodiment as exemplified by the drawings is illustrative of the invention and is not intended to limit the invention as encompassed by the claims of this application. An electronic module for eyeglass frames containing electro-active lenses is disclosed herein.

Figure 1B:
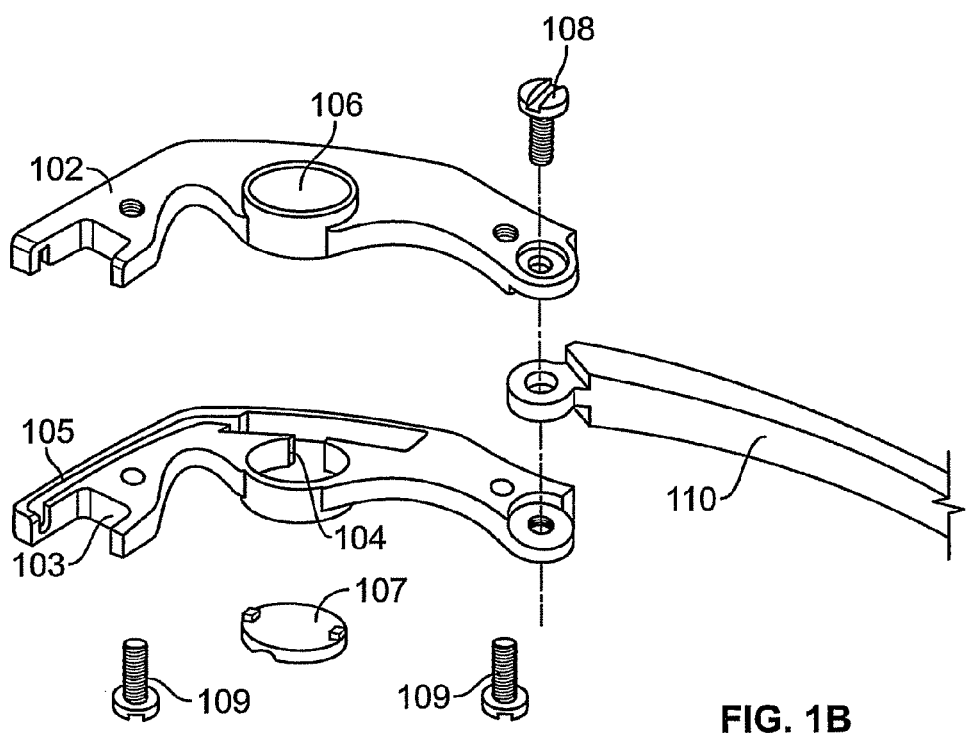
FIG. 1B is an exploded view of the universal frame housing of FIG. 1A.
Figure 1C:
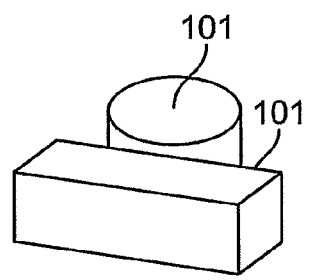
FIG. 1C is the electronic module of FIG. 1A.

FIGS. 1A-1C illustrate a specific embodiment of an eyeglass frame containing an electronic module 101. The module is specifically illustrated as a cylinder and a block section attached to the side of the cylinder in FIG. 1C. In some embodiments, the cylinder portion of the electronic module may contain both the power source and the drive circuit. The block portion may contain a sensing mechanism, for example a tilt switch. The module may also house an antenna, a receiver, a transmitter, a transceiver, a sensor, a rangefinder, a micro-processor, and a controller.

The module 101 is shown housed between an upper electro-active lens frame component piece 102 and a lower electro-active lens frame component piece 103 that contains a receptacle 104 for the module 101. The lower electro-active lens frame component piece 103 also contains a receptacle 105 for electrical conductors connecting an electro-active lens to the module. The electrical conductors may conduct for example, via a set of conductive wires or a flex circuit. A manual touch switch 106 extends up though the upper electro-active lens frame component piece 102. In some embodiments, the battery or other electronic components may be accessed via a lower module receptacle cover 107. The lower module receptacle cover 107 may be threaded and thereby opened and closed with a small screw driver. Screws 109 are used for attaching the upper and the lower electro-active lens frame component pieces together to form an electronic frame piece. The electronic frame piece may be attached to a frame temple 110 with a temple screw 108, and bonded or otherwise attached to the edge of the eye-wire 111 to complete half of the frame. In a similar manner, the corresponding other half of the frame can be assembled.

Figure 2A:
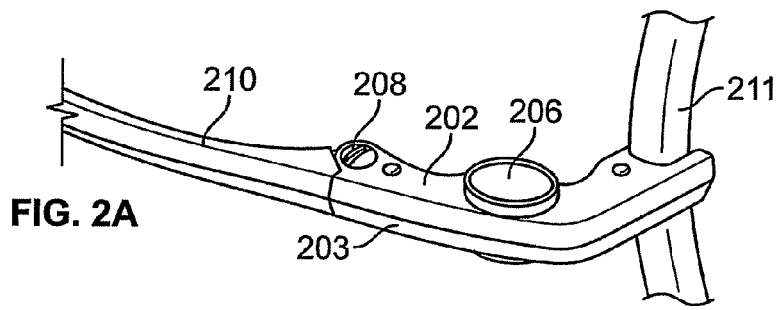
FIG. 2A illustrates another universal frame housing that comprising an electronic module, electronic connectors, and a hinge
Figure 2B:
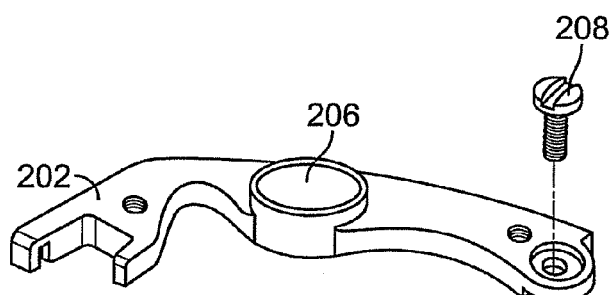
FIG. 2B is an exploded view of the universal frame housing of FIG. 2A.
Figure 2B:
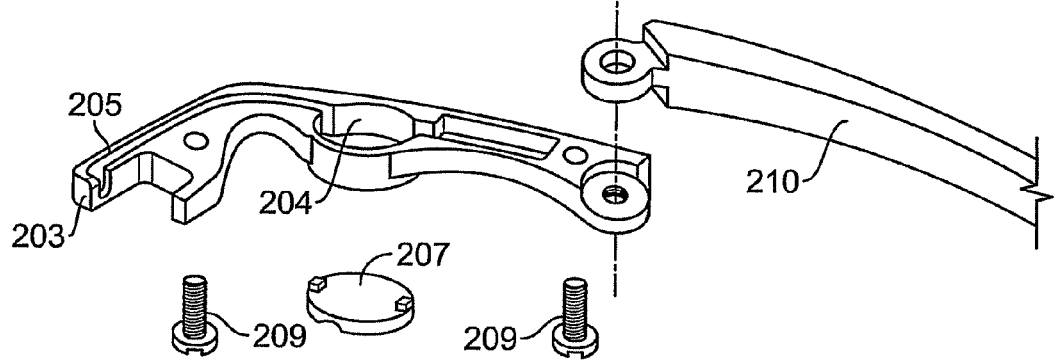
Figure 2C:
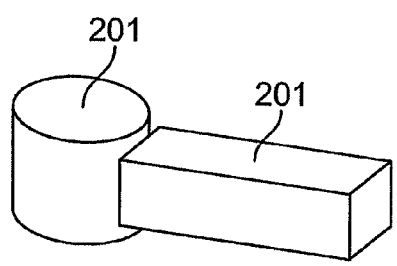
FIG. 2C is the electronic module of FIG. 2A.
Figure 3A:
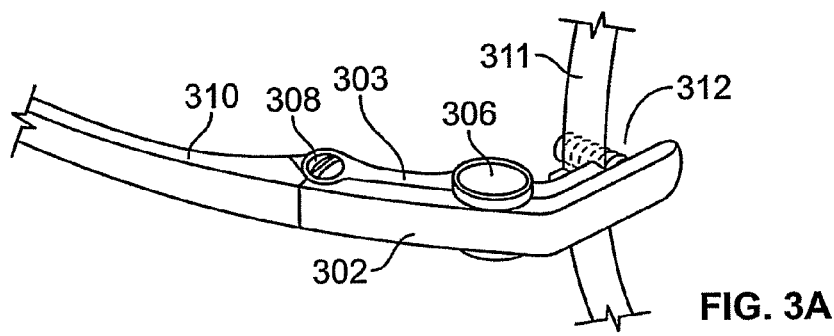
FIG. 3A illustrates another universal frame housing comprising an electronic module, electronic connectors, and a hinge.
Figure 3B:
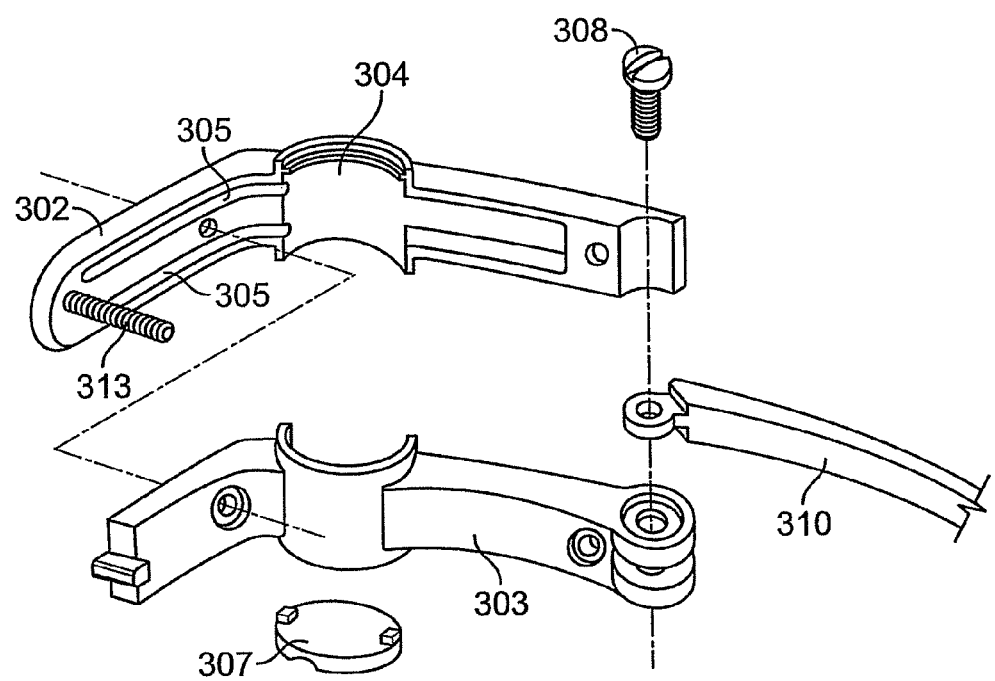
FIG. 3B is an exploded view of the universal frame housing of FIG. 3A.
Figure 3C:
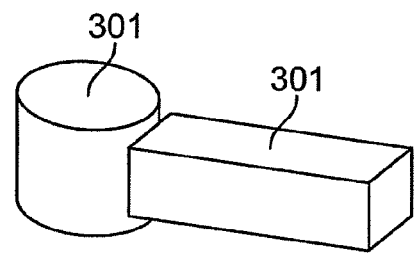
FIG. 3C is the electronic module of FIG. 3A.
Figure 3D:
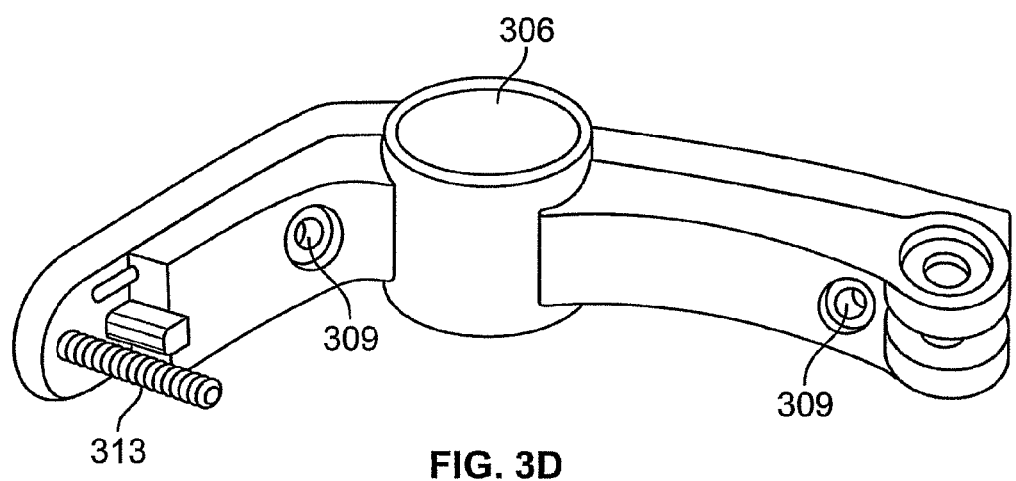
FIG. 3D illustrates a manual touch switch extending up though the assembly formed by the front and back electro-active lens frame component pieces.

FIGS. 2A-2C illustrate another embodiment of the present invention wherein the electronic frame contains an electronic module 201. The module is more particularly illustrated as a cylinder with a block section attached to the back of the cylinder in FIG. 2C. In some embodiments, the cylinder portion of the module may contain both the power source and the drive circuit. The block portion may contain a sensing mechanism. For example, a tilt switch may be used as a type of sensing mechanism. The electronic module 201 is housed between an upper electro-active lens frame component piece 202 and a lower electro-active lens frame component piece 203 that contains a receptacle 204 for the module 201. The lower electro-active lens frame component piece 103 also contains a receptacle 205 for electrical conductors connecting electro-active lens to the module. The electrical conductors may conduct for example, via a set of conductive wires or a flex circuit. A manual touch switch 206 extends up though the upper electro-active lens frame component piece 202. In some embodiments, the battery or other electronic components may be accessed via a lower electronics module receptacle cover 207, which may threaded on the sides and opened and closed with a small screw driver. Screws 209 are used for attaching upper and lower electro-active lens frame component pieces together. The electronic frame piece may be attached to a frame temple 210 with a temple screw 208, and bonded or otherwise attached to the edge of the eye-wire 111 to complete half of the frame. In a similar manner, the corresponding other half of the frame can be assembled.

FIGS. 1 and 2 illustrate two possible ways of configuring the electronics to fit them neatly into the frame. Although a cylinder and block arrangement have been specifically illustrated, other dimensional shapes may alternatively be used to form the module that will be preferably placed in a cavity and perhaps molded therein to form an electronic frame component that is hermetically sealed to prevent water from contacting the electronics.

FIGS. 3A-3D illustrate another inventive embodiment wherein the electronic frame contains a electronic module 301. The module is particularly illustrated as a cylinder with a block portion which is, in turn, attached to the back of the cylinder. As with the module of the previous figures, the module may contain a wide variety of similar electronic components and features. The electronic module 301 is housed between a front electro-active lens frame component piece 302 and a back electro-active lens frame component piece 303. Together, these pieces form a receptacle 304 for the electronics module 301. The front electro-active lens frame component piece 302 also contains a receptacle 305 for electrical conductors connecting electro-active lens to electronics module via way a set of conductive wires or a flex circuit. A manual touch switch 306 extends up though the assembly formed by the front and back electro-active lens frame component pieces. As with other embodiments, the battery or other electronic components may be accessed via a lower electronics module receptacle cover 307. The electronic frame piece is attached to a frame temple 310 with a temple screw 308. In this embodiment, the electronic frame piece is shown as attached to the frame temple 310 near the edge of the edge of electro-active spectacle lens 311. A threaded rod 313 is positioned through the front convex surface 312 of electro-active spectacle lens for the rimless mounting of the assembled front and back electro-active lens frame component pieces to an electro-active lens.

Figure 4A:
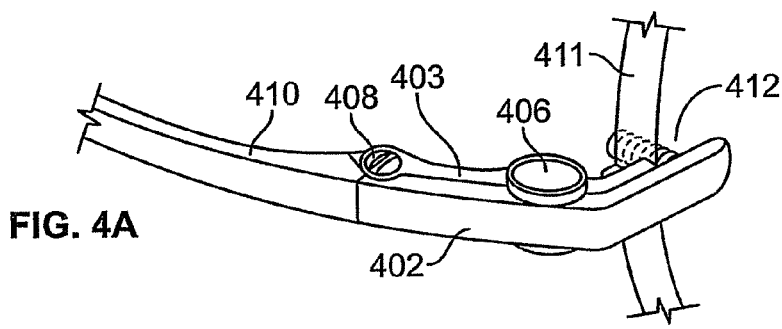
FIG. 4A illustrates another universal frame housing comprising an electronic module, electronic connectors, and a hinge.
Figure 4B:
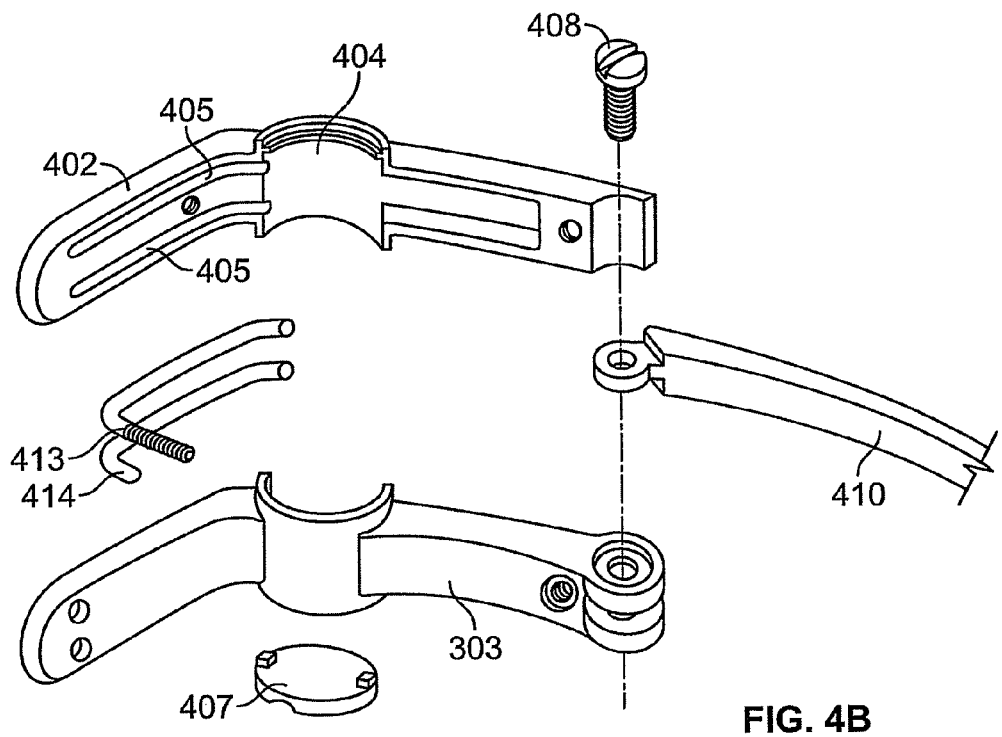
FIG. 4B is an exploded view of the hinge FIG. 4A.
Figure 4C:
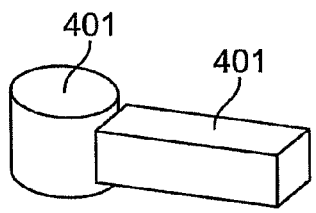
FIG. 4C is the electronic module of FIG. 4A.

FIGS. 4A-4B illustrate another embodiment of the present invention wherein the frame has an electronic module 401. The module is illustrated as a cylinder with a block portion attached to the back of the cylinder. As referred to in other embodiments disclosed herein, the module has a cylinder portion and a block portion and may contain a wide variety of similar electronic components and features. The electronic module 401 is housed between a front electro-active lens frame component piece 402 and a back electro-active lens frame component piece 403 that together form a receptacle 404 for the electronics module 401. The front electro-active lens frame component piece 302 also contains a receptacle 405 for electrical conductors connecting an electro-active lens to the module via way of set of conductive rods or pins. A manual touch switch 406 extends up though the assembly formed by the front and back electro-active lens frame component pieces. As with other embodiments, the battery or other electronic components may be accessed via a lower electronics module receptacle cover 407. The electronic frame piece is attached to a frame temple 410 with a temple screw 408. In this embodiment, the electronic frame piece is shown as attached to the frame temple 410 near the edge of the edge of electro-active spectacle lens 411. Threaded and electrically conductive rods 413 and 414 are positioned through their respective front convex surfaces the of electro-active lens for rimless mounting of the assembled front and back electro-active lens frame component pieces to the electro-active lens. Application of a first voltage to the electro-active lens through rod 413 and a second voltage through 414 to the respective edges of the electro-active lens is thereby accomplished.

Figure 5A:
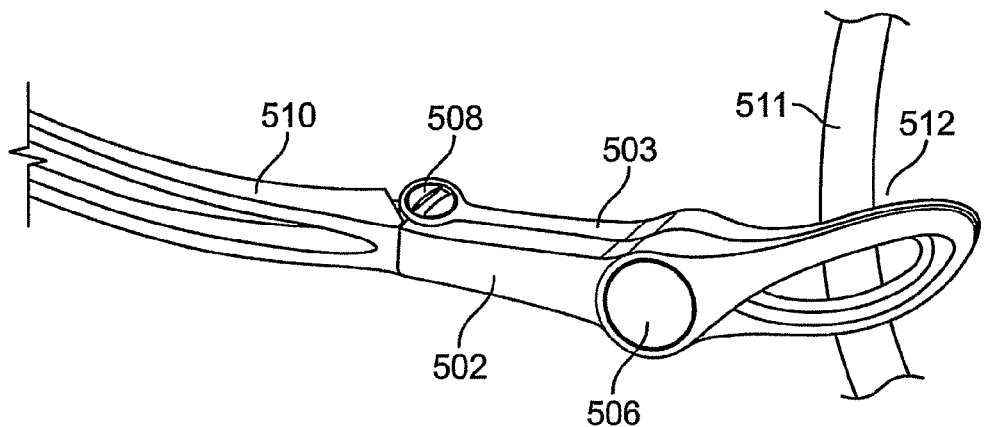
FIG. 5A illustrates an external side view of another universal frame housing comprising an electronic module, electronic connectors, and a hinge.
Figure 5B:
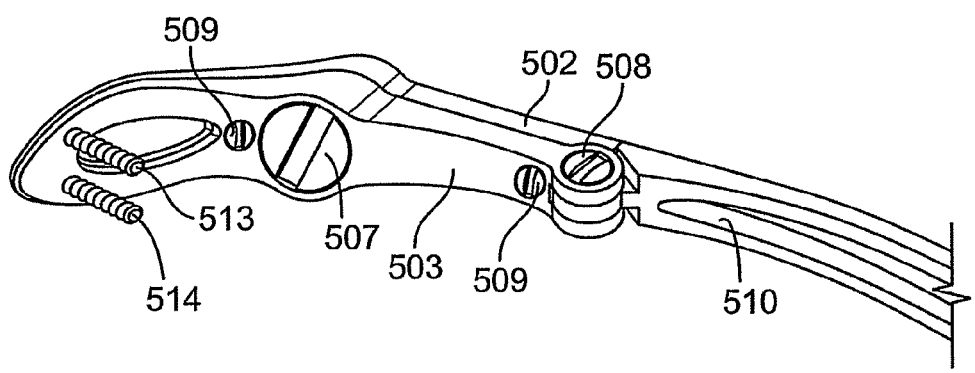
FIG. 5B is an inside or back view of the universal frame housing of FIG. 5A.
Figure 5C:
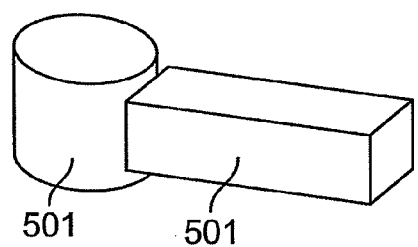
FIG. 5C is the module of the universal frame housing of FIGS. 5A and 5B.

FIGS. 5A-5C illustrate another embodiment of the present invention. In this embodiment, the electronic frame contains a electronic module 501. The module has a cylinder portion and a block portion as before described. The module 501 is housed between a front electro-active lens frame component piece 502 and a back electro-active lens frame component piece 503 that together form a receptacle 504 for the module 501. The front electro-active lens frame component piece 502 also contains a receptacle 505 for electrical conductors connecting electro-active lens to electronics module via way of set of conductive pins or rods. A manual touch switch 506 extends up though the front electro-active lens frame component pieces. As with other embodiments, the battery or other electronic components may be accessed via a lower electronics module receptacle cover 507, which may be threaded on the sides and opened and closed with a small screw driver. Screws 409 are used for attaching front and back electro-active lens frame component pieces together. The electronic frame piece is attached to a frame temple 510 with a temple screw 508. In this embodiment, the frame piece is attached to the frame temple 510 near the edge of the edge of electro-active spectacle lens 511. Threaded and electrically conductive rods 513 and 514 are positioned through their respective front convex surfaces the of electro-active lens for rimless mounting of the assembled front and back electro-active lens frame component pieces to the electro-active lens. Application of a first voltage to the electro-active lens through rod 513 and a second voltage through 514 to the respective edges of the electro-active lens is thereby accomplished.

Figure 6:
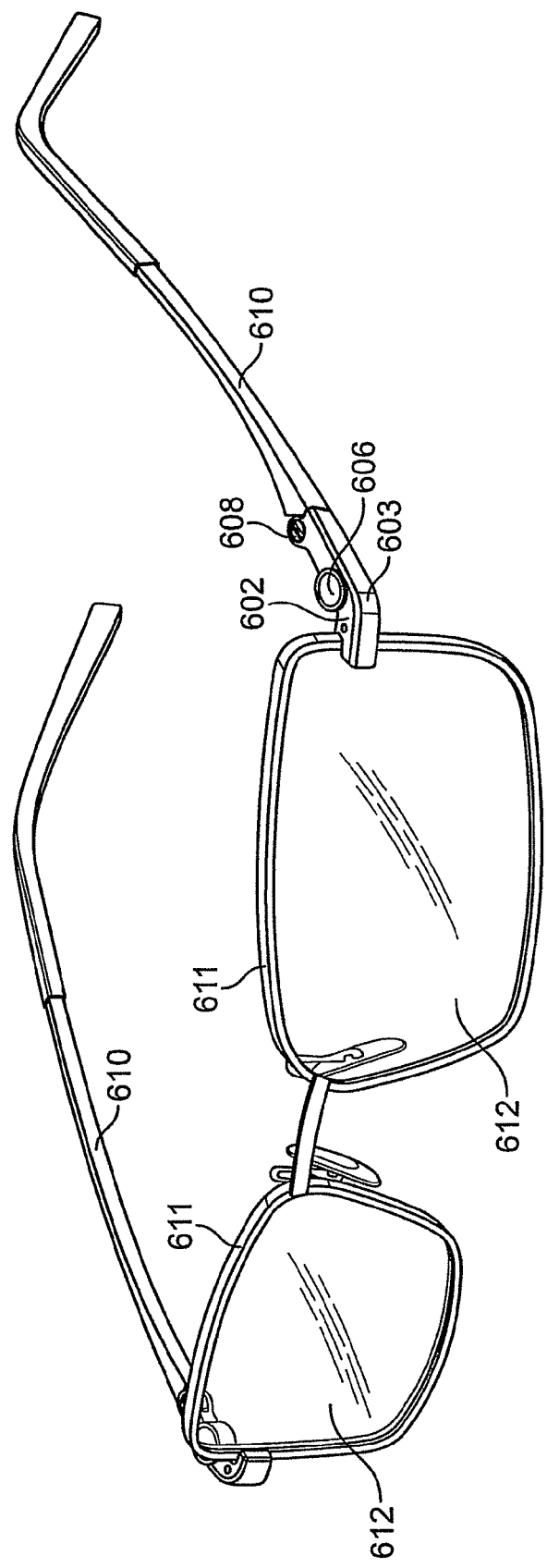
FIG. 6 illustrates one embodiment of a fully assembled electronic frame.

FIG. 6 illustrates an embodiment of a fully assembled electro-active frame. This frame is constructed from an upper electro-active lens frame component piece 602 and a lower electro active frame component piece 603. A manual touch switch 606 is shown extending from the upper electro-active lens frame component piece 602. Two temples 610 are attached the combinations of the upper and lower electro-active lens frame component pieces with temple screws 608. The temple assemblies are then mounted to the eye wires 611 of the front of the frame that contains the electro-active lenses 612.

Figure 7:
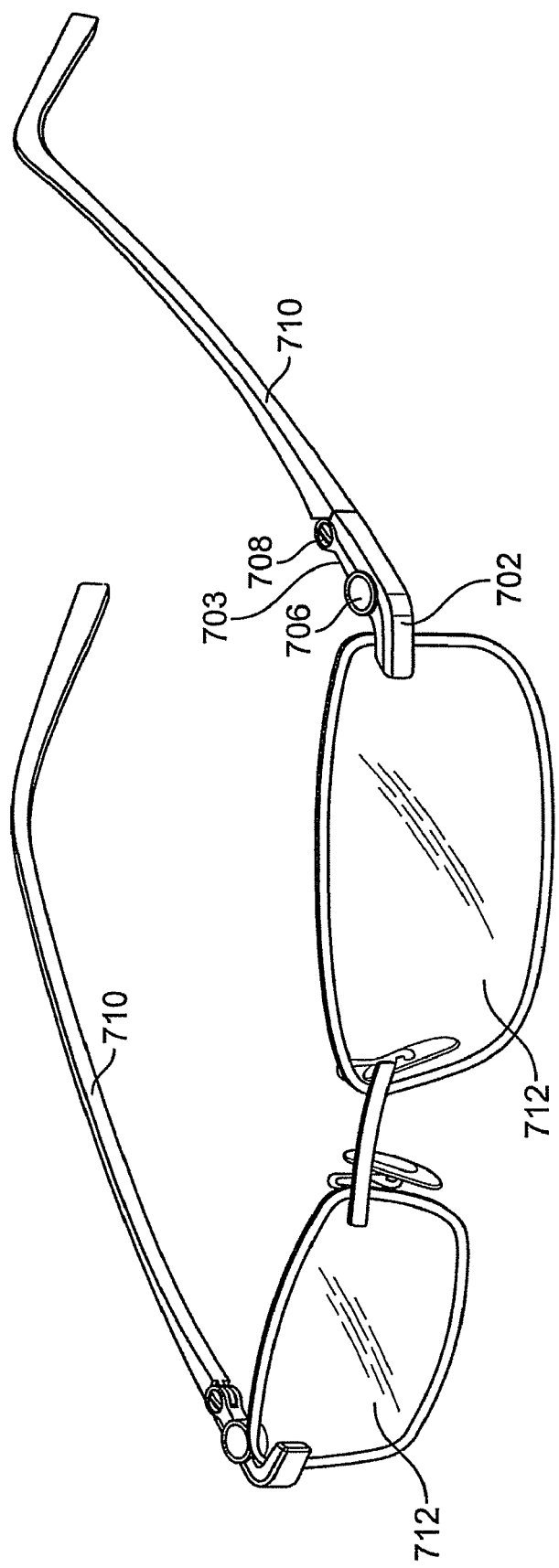
FIG. 7 illustrates another embodiment of a fully assembled electronic frame.

FIG. 7 illustrates another embodiment of a fully assembled electro-active frame. This frame is constructed from a front electro-active lens frame component piece 702 and a back electro active frame component piece 703. A manual touch switch 706 is shown extending from the front electro-active lens frame component piece 702. Two temples 710 are attached the combinations of the upper and lower electro-active lens frame component pieces with temple screws 708. The temple assemblies are then mounted to directly to the electro-active lenses 712 in a rimless fashion by one of the methods described earlier.

Figure 8A:
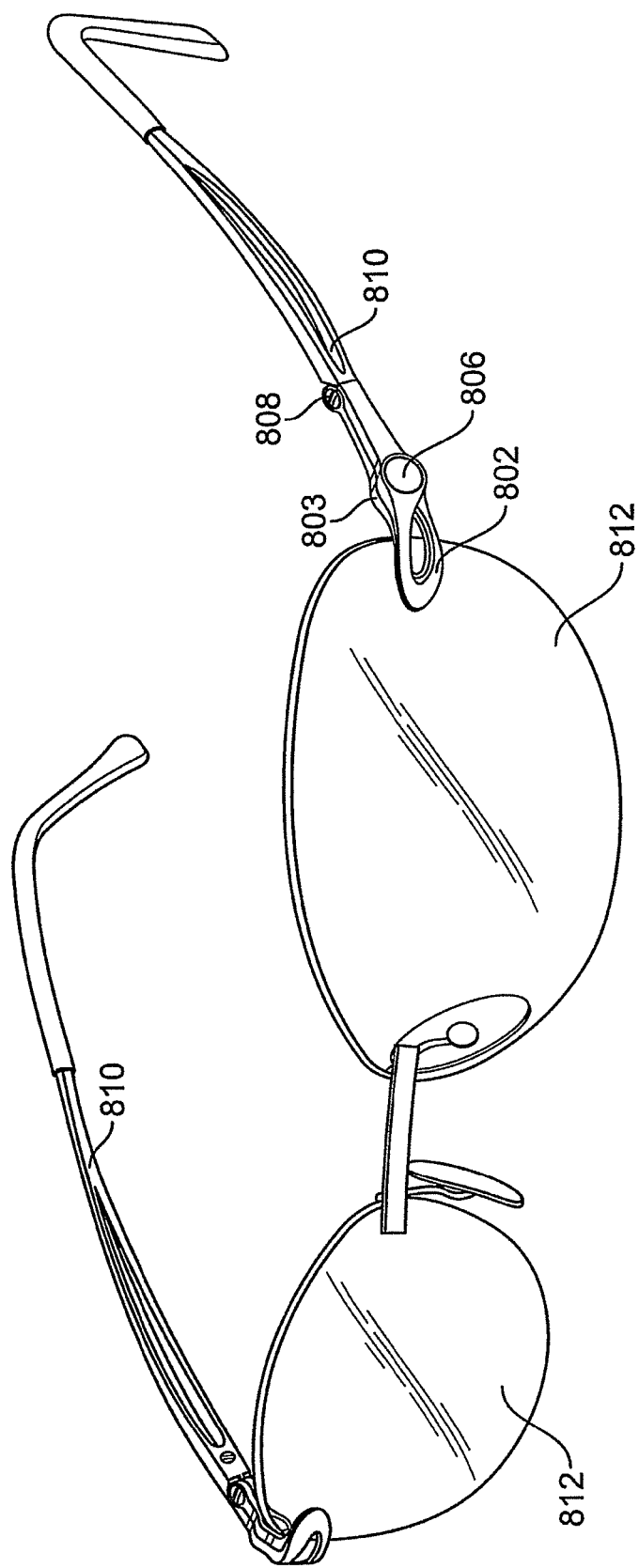
FIG. 8A illustrates another embodiment of a fully assembled electronic frame having a hinged temple.

FIG. 8A illustrates another embodiment of a fully assembled electro-active frame having a hinged temple. This frame is constructed from a front electro-active lens frame component piece 802 and a back electro active frame component piece 803. A manual touch switch 806 is shown extending from the front electro-active lens frame component piece 802. Two temples 810 are attached to the combinations of the upper and lower electro-active lens frame component pieces by a hinge with temple screws 808. The temple assemblies are then mounted to directly to the electro-active lenses 812 in a rimless fashion by one of the methods described earlier.

Figure 8B:
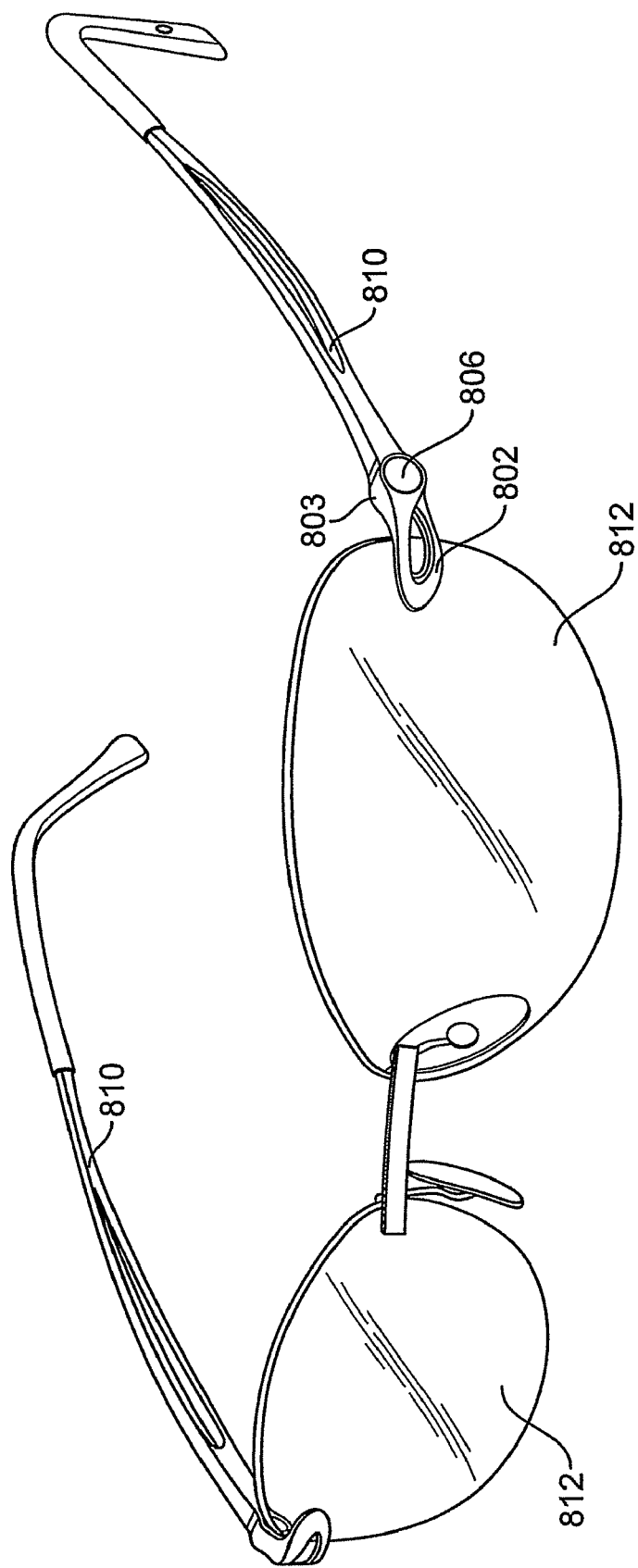
FIG. 8B illustrates another embodiment of a fully assembled electronic frame having a hinge-less temple.

FIG. 8B illustrates an embodiment similar to the embodiment of FIG. 8A, but for having a hingless temple. This frame is constructed from a front electro-active lens frame component piece 802 and a back electro active frame component piece 803. A manual touch switch 806 is shown extending from the front electro-active lens frame component piece 802. Two temples 810 are directly attached to the combinations of the upper and lower electro-active lens frame component pieces with temple screws 808. The temple assemblies are then mounted to directly to the electro-active lenses 812 in a rimless fashion by one of the methods described earlier.

Figure 9A:
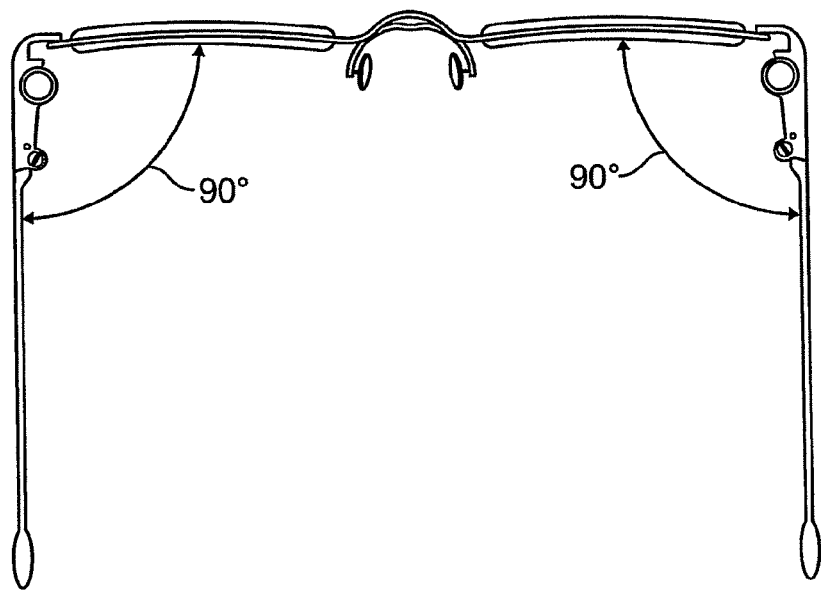
FIG. 9A illustrates the top view of an electro-active spectacle lenses, rimmed frame and universal frame housings comprising electronic modules, electronic connectors, and hinges.

FIG. 9A illustrates a top view of a electro-active spectacle lenses and rimmed frame. The rimmed frame can be made of zyle, metal, or any combination thereof. Both right front spatial void 910 and left frame front spatial void 920 is shown. Within either or both of these voids, a module may be placed. As particularly shown in FIG. 9A, modules 930 and 940 are placed on the frame and attached to the frame stems 970 and 980 with temple screws 950 and 960. The modules are then connected to the eye wires 994 and 995 and are connected to the nose bridge 930. The eye wires support the electro-active lenses 996 and 998.

Figure 9B:
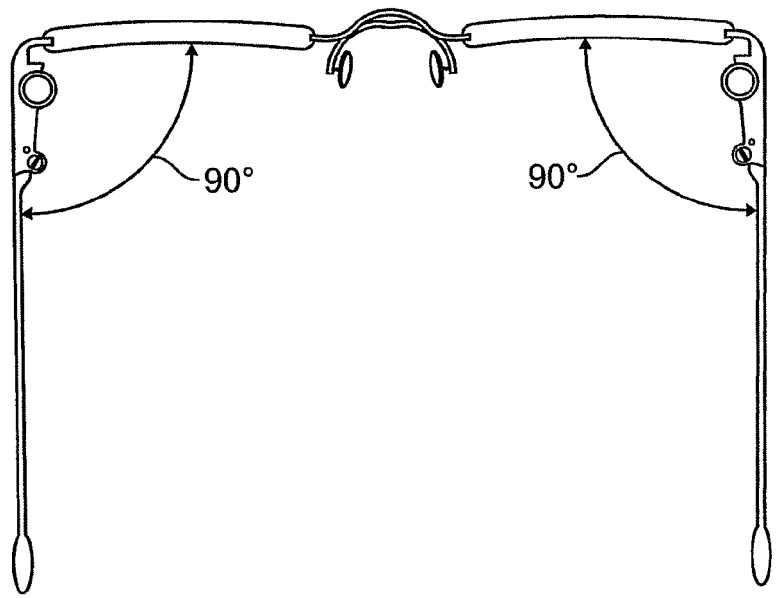
FIG. 9B illustrates the embodiment of FIG. 9A, but with a rimless style of lens mounting.

FIG. 9B illustrates an embodiment of the electro-active spectacle lenses and frame as similar to that shown in FIG. 9A but in a rimless style of lens mounting. Rimless right spatial void 910 and rimless left spatial void 920 are shown.

Figure 9C:
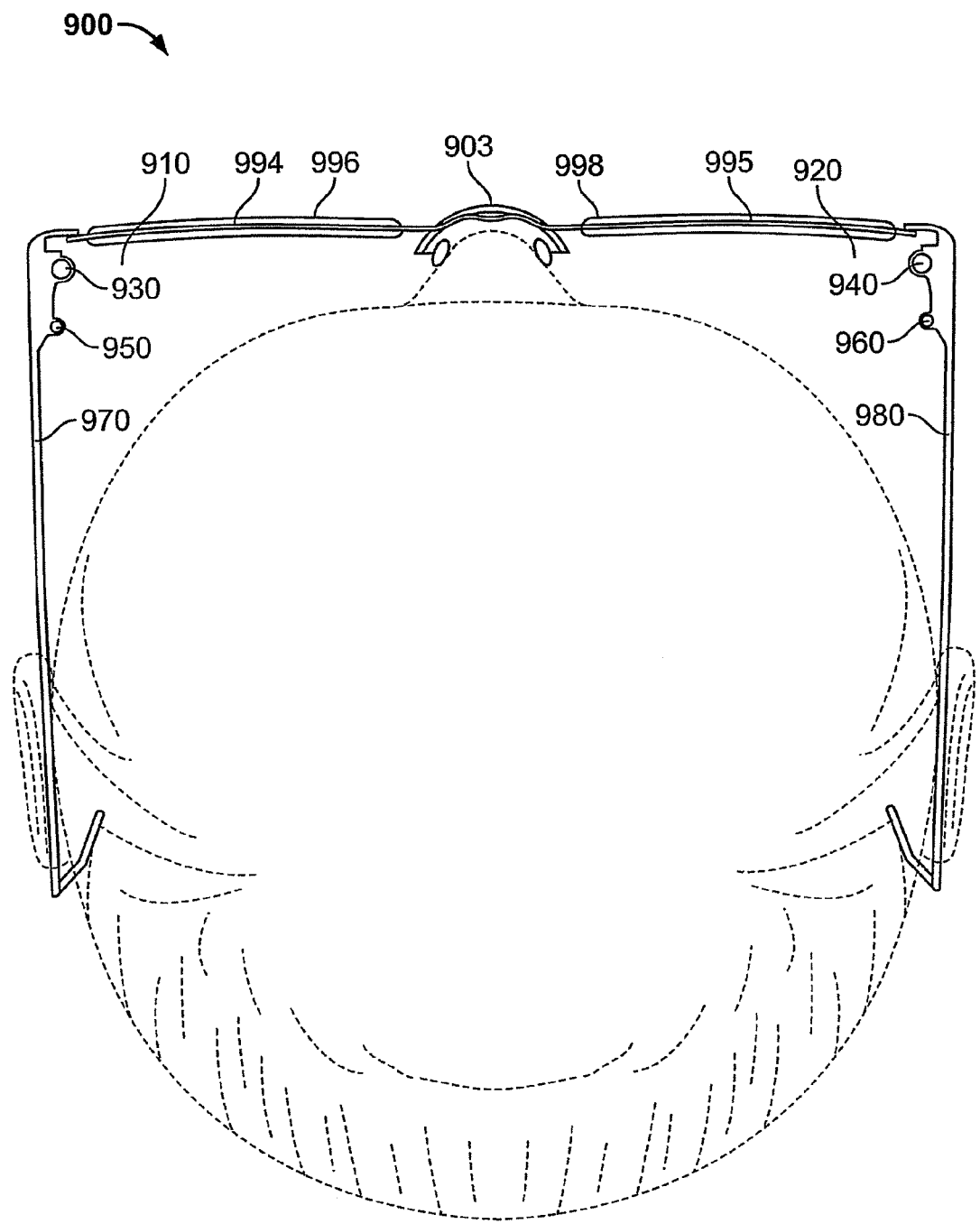
FIG. 9C illustrates the embodiment of FIG. 9A as worn on a wearer's head and further illustrates the right spatial void and the left spatial void.

FIG. 9C depicts the embodiment of FIG. 9A worn on the head of a wearer. The spatial voids created by the space between the joint of the frame and temple on the one hand, and the curve of the wearer's head, on the other is clearly shown.

Figure 10:
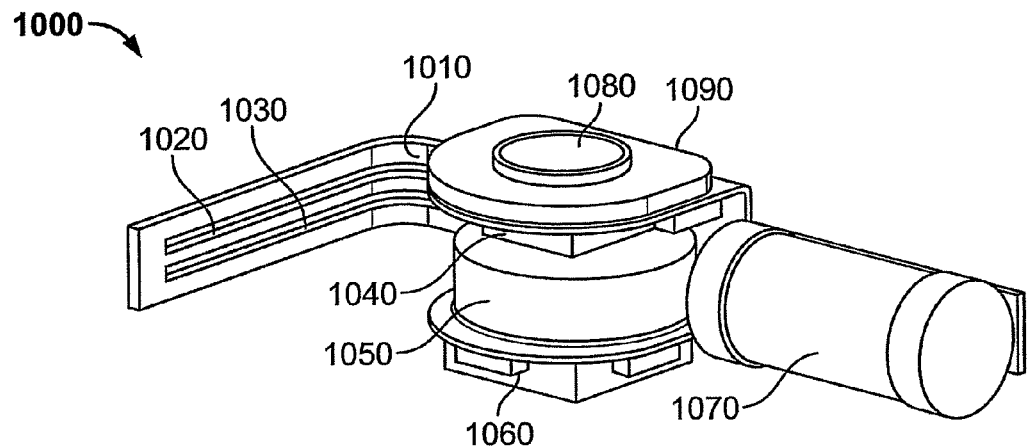
FIG. 10 illustrates an electronic module of another embodiment of the present invention which includes a tilt switch.

FIG. 10 illustrates an electronic module 1000 of another embodiment of the present invention. The module includes a flex circuit 1010 with two conductive buses 1020 and 1030 for making electrical contact to the front surface of an electro-active lens. The module includes a drive circuit 1040 placed above a rechargeable battery 1050. Below the battery is a recharging coil 1060. The charging coil is used to inductively recharge the battery without direct contact. In this way, the module may be hermetically sealed while still allowing the battery to be recharged without breaking a moisture resistant seal. A tilt sensor 1070 is also attached to the electronic module. A manual switch 1080 is attached to the top of the electronic module and is integrated with a sealing diaphragm 1090. This module is sealed with an epoxy, silicone, or similar water resistant material to prevent water from contacting the electronic components. This module is shaped to fit into a universal frame electronic component as illustrated in FIG. 11.

Figure 11:
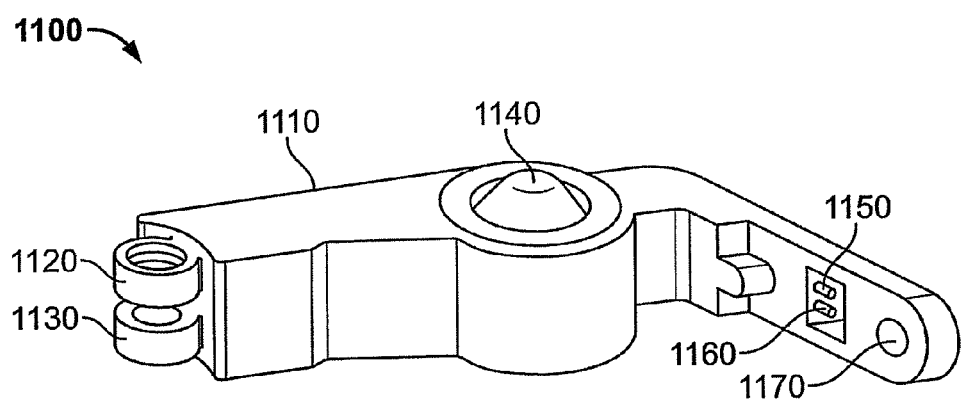
FIG. 11 illustrates a universal frame housing that comprises the electronic module, electrical connectors, and hinge.

In FIG. 11, a universal electronic frame component 1100 is shown. The universal electronic frame component comprises a housing 1110 for holding the electronic module described in FIG. 10. A set of thread hinge bolt 1120 and 1130 are mounted on the housing for accommodating a wide variety of frame stem styles to be attached to the universal electronic frame component. The top of the housing 1110 has an aperture to allow a manual switch 1140 to extend outward so as to be accessed by the wearer. Extending out of an opening in the housing are two electrical contacts 1150 and 1160 from the buses described in FIG. 10. Near these contact points, there is a through hole 1170 to allow a mounting pin to pass through the front of the universal electronic frame component for attaching to an electro-active lens.

Figure 12A:
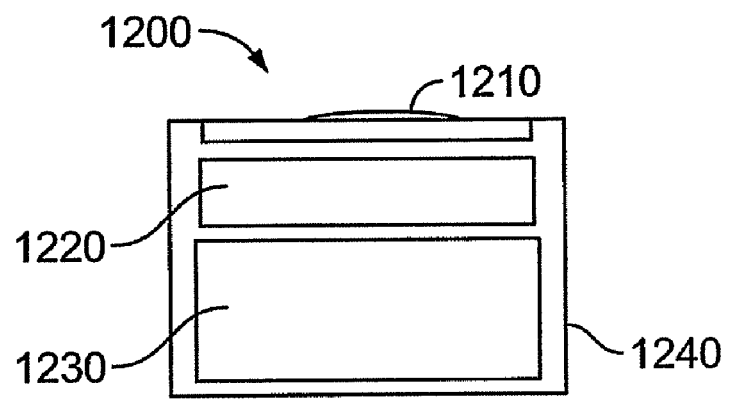
FIG. 12A illustrates a cross section of an embodiment of the electronic module of the present invention without a tilt switch
Figure 12B:
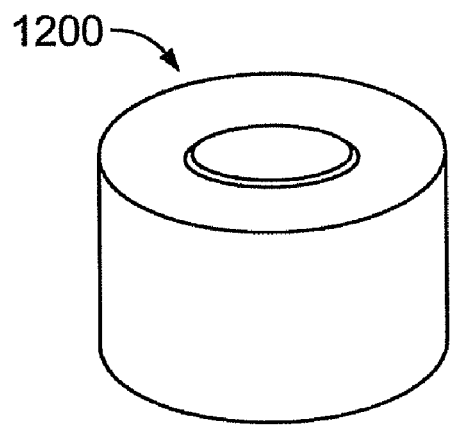
FIG. 12B is an isometric view of the module of FIG. 12A.

The module 1200, as illustrated schematically FIG. 12A and in cross section in FIG. 12B, contains a battery 1230 for powering an electro-active lens and related drive circuitry, a printed circuit board 1220 with drive and control electronics, and a switch 1210. The module may also contain a membrane switch to allow for manual control of the electro-active lens.

Figure 12C:
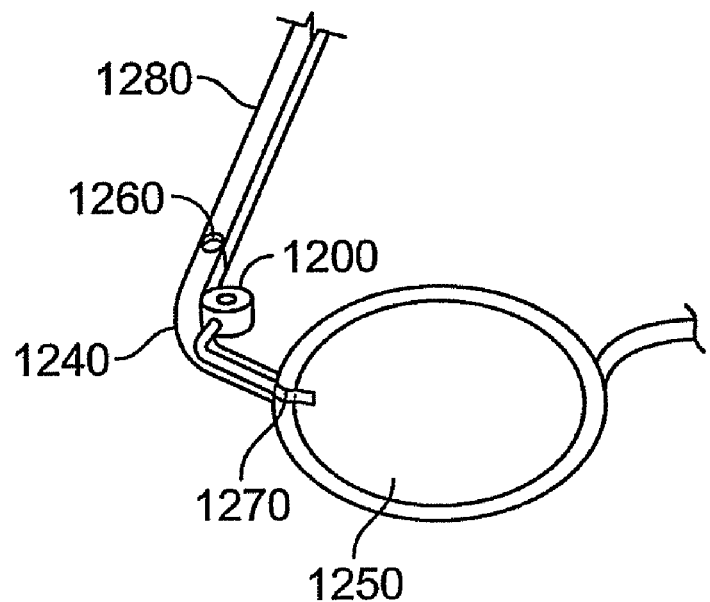
FIG. 12C illustrates the module of FIG. 12A in an eyeglass frame behind its frame stem section.

FIG. 12C illustrates the module 1200 placed in an eyeglass frame 1250. The frame has a frame stem section 1240 near the front of the frame but also well in front of a frame hinge 1260 that connects a stem 1280 to the front of the frame. The module is preferably placed behind the frame stem section, provided that the frame is not of a full rimless design. In the event of a full rimless design, the inventive electronic module or modules would fit within or near the space (right spatial void and left spatial void) anterior to the hinge and would then attach to the lens. In certain other inventive embodiments where there is no hinge (hinge-less temples) and eyeglass frames that have a continuous temple that attaches directly to the frame front or directly to the lens, the module would preferably be located within or near the space (right spatial void and left spatial void). In fact, the module can be located anywhere within these two spatial voids.

Although in most embodiments of the invention, the modules are preferably located interior to that of the frame front or temple and closer to the wearer, there are other inventive embodiments where the module may be located on the side of the frame front, on the temple farthest away from the wearer, on both the inside of the temple closest to the wearer, on the outside of the temple away from the wearer, located within the temple, or any combination thereof.

When a hinge-less temple is used, the module can be located on or in the temple end piece behind the ear of the wearer. Alternatively, the module may be split such that one module is located behind the ear and another module is located within the right or left temple spatial void that is common to a side of the wearer's head.

By sizing the module to be no higher than the width of the front of the frame stem section 1240, the module is completely undetectable by an observer. Power is preferably provided to the lens via a two conductor flex circuit 1270 extending from the module through the frame stem 1240.

In some embodiments in which a hinge-less temple is used the hinge-less temple may be made of titanium which is conductive to electrical current. In this case, the titanium may be used as one of the electrical leads. Another lead may be affixed onto or into the frame. A very thin conductor may be adhesively applied to the inside of the temple and sealed by way of a lacquer or polymer that is cured over the thin conductor. In this embodiment, since the temple is hinge-less, the electronics can be located anywhere along or in said temple. The temple itself becomes, in part, a conductor of electrical current from the module or modules to where the hinge-less temple connects to either the lens or to the front of the eyeglass frame.

Figure 13A:
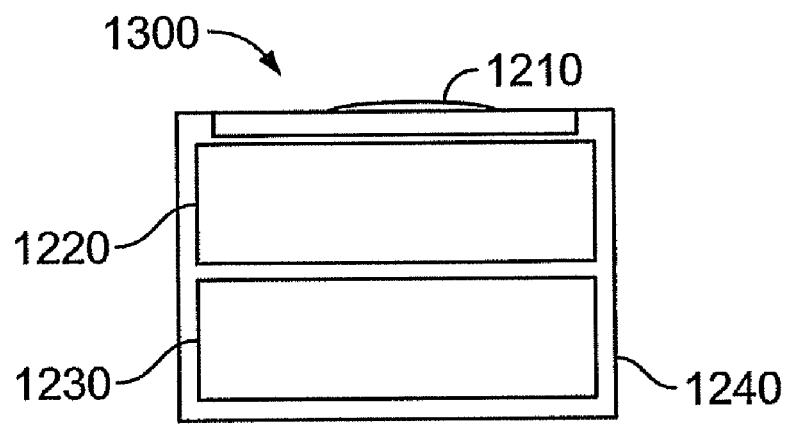
FIG. 13A illustrates another embodiment of the electronic module of the present invention which contains two batteries.
Figure 13B:
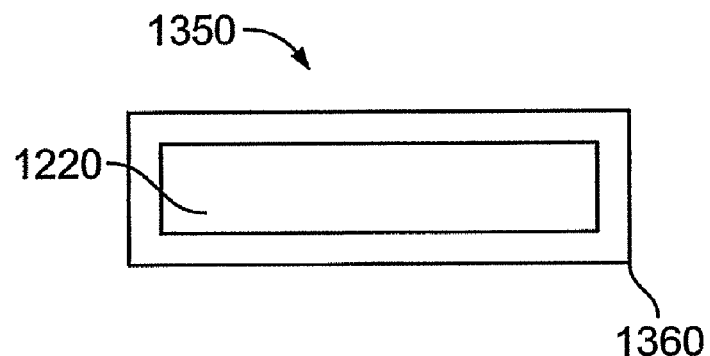
FIG. 13B is a cross section of the module of FIG. 13A.

FIGS. 13A and 13B illustrate another embodiment of the present invention. This embodiment has a module 1240 containing two batteries 1220 and 1230. In this embodiment, the height of the module may be too large to accommodate the printed circuit board that is used to drive the electro-active lenses. In such cases, a second module will be required to provide for the space required for the printed circuit board.

Figure 13C:
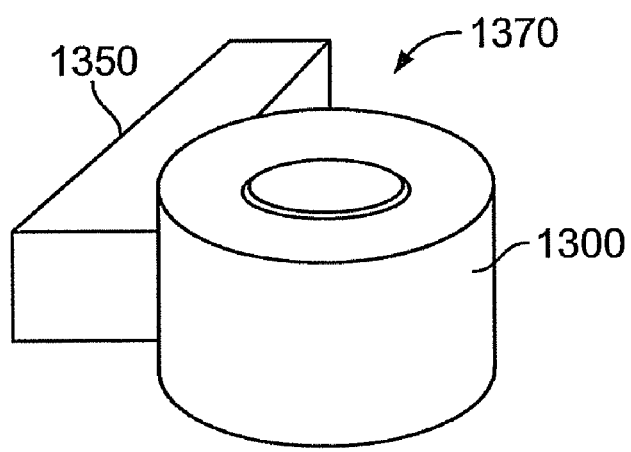
FIG. 13C illustrates a combined electronic module which includes a tilt switch.

FIG. 13C illustrates a module 1370 that combines 1350 and 1300. The modules 1350 and 1300 may be electrically connected to each other via means of a flex circuit connector, or other means known in the art.

Figure 13D:
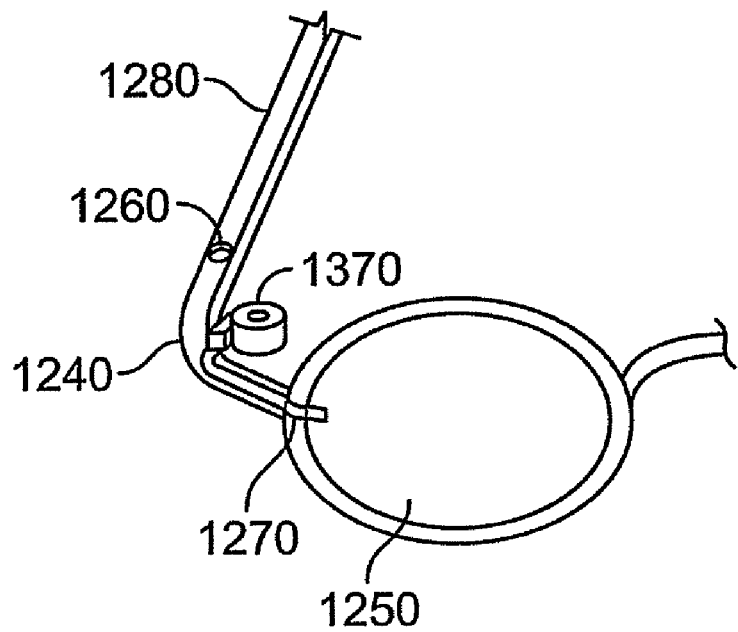
FIG. 13D illustrate the module of FIG. 13A placed in an eyeglass frame anterior to the hinge and connecting to the lens.

FIG. 13D illustrates the combined module 1370 placed in the frame 1250 near the front of the frame but behind the frame stem section 1240 of the frame. This arrangement of the electronics in the frame allows for a cosmetically acceptable placement of the electronics and battery that is needed for powering an electro-active lens.

The module may further include one or more of the following: a manual switch (for example, a touch button, photo-detector, motion detector, capacitive touch sensor), a controller and/or micro-processor, a power source (for example, a small battery), a sensor (for example, one or more miniature or micro tilt switches, accelerometer, micro gyro, range finder, view detector, imager), an antenna, a transmitter, a transceiver or a receiver. The module preferably houses any of the aforementioned electrical components in a substantially water-proof and wear resistant/moisture resistant environment and is preferably hermetically sealed. In the event of a malfunction of one or more of the electronic components housed within the module, the module can be replaced without having to repurchase a complete pair of new electronic eyewear (lenses and frames) or just the frames. It should be pointed out that in certain applications, a single inventive electronic module may be sufficient, and in others, two or more modules may be needed. The embodiments described in FIGS. 12 and 13 allow for modification of any number of existing frames that otherwise were not originally designed to support electronics for driving electro-active lenses.

Figure 14:
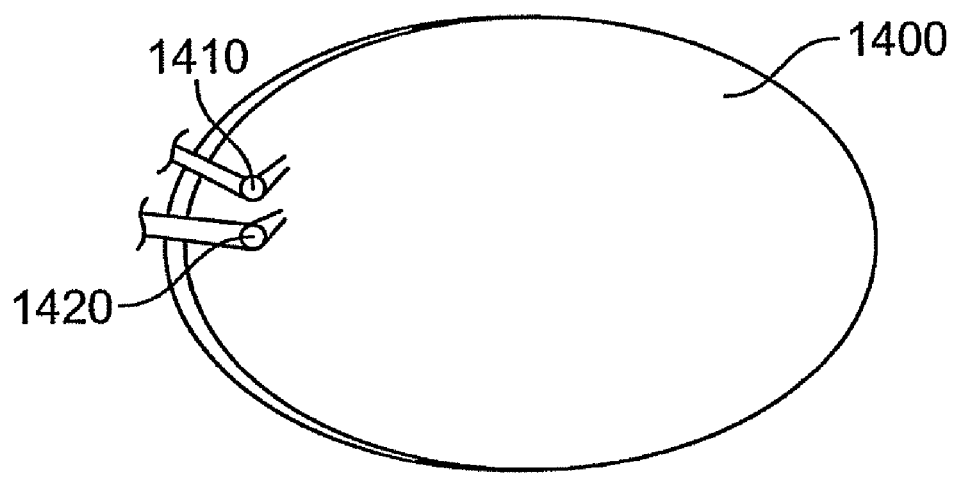
FIG. 14 illustrates one possible electrical contact into the lens from the frame.

FIG. 14 illustrates one possible electrical contact into the lens from the frame. Pins or bolts 1410 and 1420 provide electrical power from the drive circuit into the lens 1400.

Figure 15A:
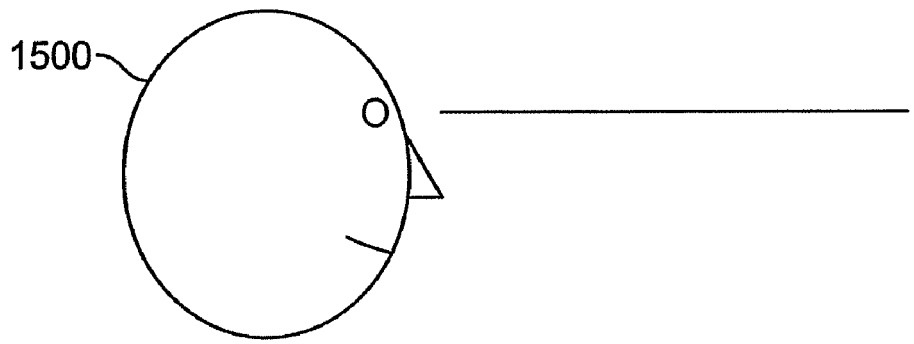
FIG. 15A illustrates a wearer of an eyeglass frame having a tilt switch looking straight ahead approximately even with the horizon.
Figure 15B:
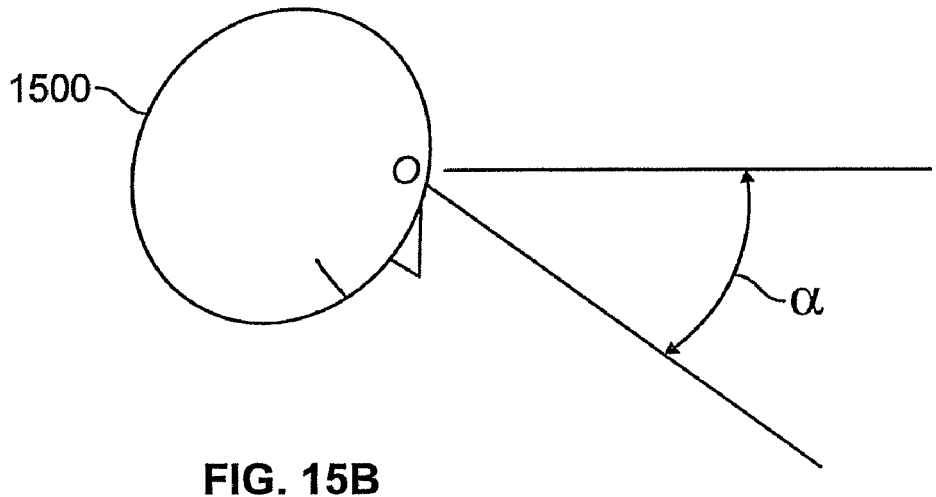
FIG. 15B illustrates a wearer of an eyeglass frame having a tilt switch with his head in a position where he is looking downward at angle $\alpha$ from the horizontal.
Figure 15C:
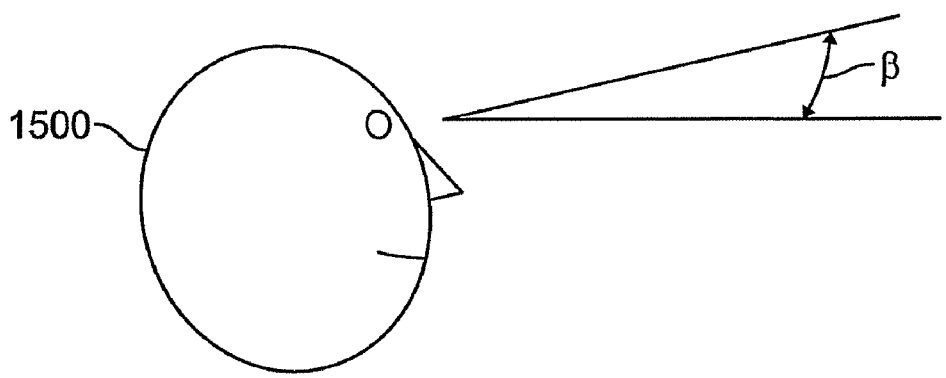
FIG. 15C illustrates a wearer of an eyeglass frame having a tilt switch with his head in a position where he is looking upward at angle $\beta$ above the horizontal.

FIGS. 15A through 15C illustrate a method of controlling the electro-active lens using a tilt switch that may be contained in the module. The tilt switch should preferably have a wide angle for making contact and a smaller angle for breaking contact. In particular, FIG. 15A illustrates the wearer looking on a straight level ahead substantially to the horizon. In this position, the lens would be preferably switched off. As wearer lowers his head passed angle α, the electro-active lens would be deliberately turned off. In this illustration, the angle α may be a large angle, perhaps as large as 45 degrees or more. In preferred embodiments, angle α may be in a range of from about 25 to about 85 degrees, with a most preferred range of 35 to 75 degrees. When the switch has been activated, because the wearer has deliberately moved his head to past angle α, the electro-active lens would remain in its on state until the person raises his head above the angle β, as illustrated in FIG. 15C. In preferred embodiments, angle β may be in a range of from about 0 to about 45 degrees with a most preferred range of 0 to 25 degrees. By having a tilt switch of an electro-active lens operate in this manner, a person can control his lens without having to manually touch a switch on the frame.

Although the particular embodiments shown and described above will prove to be useful in many applications in the ophthalmic and the electronic eyewear art to which the present invention pertains, further modifications of the present invention will occur to persons skilled in the art. All such modifications are deemed to be within the scope and spirit of the present invention as defined by the appended claims.

What is claimed is:

1. Eyewear comprising:
   a) a frame; and
   b) a sealed moisture resistant module attached to the frame, wherein the module comprises any two of: a power source, a drive circuit, and a sensing mechanism, wherein the sealed moisture resistant module is disposed within the frame.

2. The eyewear of claim 1, wherein the eyewear comprises electro-active lenses mounted in the frame, and wherein the electro-active lenses comprise an electro-chromic material.

3. The eyewear of claim 1, wherein the eyewear comprises electro-active lenses mounted in the frame, and wherein the electro-active lenses are configured to change tint.

4. The eyewear of claim 3, wherein the electro-active lenses are configured to change tint by tint shuttering.

5. The eyewear of claim 1, wherein the frame comprises a first temple and a second temple, and wherein the module is disposed within the first temple.

6. The eyewear of claim 1, wherein the sealed moisture resistant module includes each of a controller, a sensing mechanism, and a power source.

7. The eyewear of claim 1, wherein the sealed moisture resistant module further includes any one of, or some combination of: an antenna, a transmitter, a transceiver, or a receiver.

8. The eyewear of claim 1, wherein the sealed moisture resistant module includes a sensing mechanism, and wherein the sensing mechanism comprises a manual switch.

9. The eyewear of claim 8, wherein the manual switch comprises a capacitive switch.

10. The eyewear of claim 8, wherein the manual switch comprises a membrane switch.

11. A method of changing electro-active eyeglasses comprising:
    a) providing a frame;
    b) providing electro-active lenses mounted in the frame, the electro-active lenses capable of changing upon receipt of an electronic signal; and
    c) sending an electronic signal to the electro-active lenses upon activation of a manual switch that is located on the frame, wherein the manual switch comprises a capacitive touch switch, and
    wherein the capacitive touch switch is sealed within a moisture resistant module.

12. The method of claim 11, wherein the manual switch extends from the frame.

13. The method of claim 11, wherein the electro-active lenses comprise an electro-chromic material.

14. The method of claim 11, wherein the electro-active lenses are configured to change tint.

15. The method of claim 11, wherein the module is hermetically sealed.

16. The method of claim 11, wherein the module is substantially water-proof.

17. The method of claim 16, wherein the module is water-proof.

18. The method of claim 11, wherein the module is substantially wear resistant.

19. The method of claim 11, wherein the module is substantially water resistant.

20. The method of claim 11, wherein the module is water resistant.

21. The method of claim 11, wherein the module is sealed using a water resistant material.

22. The method of claim 11, wherein the module is sealed using any one of, or some combination of: an epoxy or silicone.

23. The method of claim 11, wherein the module includes a power source, and wherein the power source comprises a rechargeable battery.

24. The method of claim 11,
    wherein the eyewear comprises an electro-active lens; and
    wherein the module includes electronic components configured to enable any of the following:
    dynamically alter focus;
    dynamically alter tint; or
    tint shuttering.

25. The method of claim 11, wherein the module includes electronic components configured to enable an electronic display.

26. The method of claim 11, wherein said frame comprises any of the following:
    a metal frame;
    a zyle frame;
    a rimless frame;
    a partially rimless frame;
    a hinge-less temple; or
    a hinged temple.

27. The method of claim 11,
    wherein the eyewear comprises at least one electronic component disposed outside of the electronic module; and
    wherein the module is electrically connected to the electronic component by a flex circuit.

28. The method of claim 27, wherein the electronic component comprises an electro-active lens.

29. Eyewear comprising:
    a) a frame; and
    b) a sealed moisture resistant module attached to the frame, wherein the module comprises any two of: a power source, a drive circuit, and a sensing mechanism, wherein the sealed moisture resistant module includes a sensing mechanism, and wherein the sensing mechanism comprises a tilt switch.

30. The eyewear of claim 29, wherein the tilt switch comprises any one of an accelerometer or a gyroscope.

* * * * *